United States Patent
Rosen

(10) Patent No.: US 9,355,406 B2
(45) Date of Patent: May 31, 2016

(54) SYSTEMS AND METHODS FOR DETERMINING IMAGE SAFETY

(71) Applicant: GumGum, Inc., Santa Monica, CA (US)

(72) Inventor: Daniel Scott Rosen, Thousand Oaks, CA (US)

(73) Assignee: GumGum, Inc., Santa Monica, CA (US)

(*) Notice: Subject to any disclaimer, the term of this patent is extended or adjusted under 35 U.S.C. 154(b) by 43 days.

(21) Appl. No.: 14/196,695

(22) Filed: Mar. 4, 2014

(65) Prior Publication Data

US 2015/0023552 A1 Jan. 22, 2015

Related U.S. Application Data

(60) Provisional application No. 61/847,940, filed on Jul. 18, 2013.

(51) Int. Cl.
*G06K 9/00* (2006.01)
*G06Q 30/02* (2012.01)
*G06T 7/00* (2006.01)

(52) U.S. Cl.
CPC ........ *G06Q 30/0251* (2013.01); *G06K 9/00362* (2013.01); *G06T 7/0046* (2013.01); *G06T 2207/10004* (2013.01); *G06T 2207/10024* (2013.01); *G06T 2207/20081* (2013.01); *G06T 2207/30196* (2013.01); *G06T 2207/30201* (2013.01)

(58) Field of Classification Search
None
See application file for complete search history.

(56) References Cited

U.S. PATENT DOCUMENTS

| | | | | |
|---|---|---|---|---|
| 6,751,348 B2* | 6/2004 | Buzuloiu et al. | | 382/165 |
| 6,895,111 B1* | 5/2005 | Swift | | 382/165 |
| 7,103,215 B2* | 9/2006 | Buzuloiu et al. | | 382/165 |
| 8,065,611 B1* | 11/2011 | Chan | | G06F 17/3028 382/305 |
| 8,358,846 B2* | 1/2013 | Gibbs | | 382/181 |
| 8,411,964 B2* | 4/2013 | Choi | | 382/195 |
| 2002/0159630 A1* | 10/2002 | Buzuloiu | | G06K 9/00228 382/165 |
| 2004/0208361 A1* | 10/2004 | Buzuloiu et al. | | 382/165 |
| 2009/0123064 A1* | 5/2009 | Gibbs | | 382/165 |
| 2010/0310158 A1* | 12/2010 | Fu et al. | | 382/159 |
| 2011/0135204 A1* | 6/2011 | Choi | | G06K 9/00362 382/195 |
| 2014/0198982 A1* | 7/2014 | Dinerstein et al. | | 382/165 |

FOREIGN PATENT DOCUMENTS

WO  WO 2009144330  * 12/2009 ............ G06K 91/00

OTHER PUBLICATIONS

Jones, Michael J., and James M. Rehg. "Statistical color models with application to skin detection." International Journal of Computer Vision 46.1 (2002): 81-96.*
Ap-Apid, Rigan. "An algorithm for nudity detection." 5th Philippine Computing Science Congress. 2005.*

(Continued)

*Primary Examiner* — Bhavesh Mehta
*Assistant Examiner* — Narek Zohrabyan
(74) *Attorney, Agent, or Firm* — Knobbe, Martens, Olson & Bear, LLP

(57) ABSTRACT

Systems and methods are provided for determining the safety of an image, which may be used to determine whether an image is appropriate for a given purpose or for use in a given context. Determining the safety of the image may include analyzing the image to determine the amount of skin exposed in various key body areas of each human represented in the image, such as a photograph.

19 Claims, 5 Drawing Sheets

(56) References Cited

OTHER PUBLICATIONS

Mofadde, Mahmoud, and Samy Sadek. "Adult image content filtering: A statistical method based on Multi-Color Skin Modeling." Signal Processing and Information Technology (ISSPIT), 2010 IEEE International Symposium on. IEEE, 2010.*

Zhu, Hong, et al. "An algorithm of pornographic image detection." Image and Graphics, 2007. ICIG 2007. Fourth International Conference on. IEEE, 2007.*

Bala, Murali R., et al. "Intelligent Approach to Block Objectionable Images in Websites." Advances in Recent Technologies in Communication and Computing (ARTCom), 2010 International Conference on. IEEE, 2010.*

Shen, Xuanjing, Wei Wei, and Qingji Qian. "A pornographic image filtering model based on erotic part." Image and Signal Processing (CISP), 2010 3rd International Congress on. vol. 5. IEEE, 2010.*

Bashour, M., "Is an Objective Measuring System for Facial Attractiveness Possible?", 2005, available at http://dissertation.com/book.php?book=1581123655&method=ISBN.

Bin Abdul Rahman, N. A., et al., 'RGB-H-CbCr Skin Colour Model for Human Face Detection', Multimedia University, Information Technology, 2007.

Castrillon-Santana, M. et al., "ENCARA2: Real-time Detection of Multiple Faces at Different Resolutions in Video Streams", Journal of Visual Communication and Image Representation, pp. 130-140, Jan. 22, 2007.

Fuangkhon, P., et al., "Nipple Detection for Obscene Pictures", SSIP '05 Proceedings of the 5th WSEAS International conference on Signal, Speech and Image Processing, pp. 242-247, 2005.

Kasaei, S. A., "Pixel-Based Skin Detection for Pornography Filtering", Iranian Journal of Electrical and Electronic Engineering, Jul. 3, 2005.

Lin, Y.C. et al., "Pornography Detection Using Support Vector Machine", 16th IPPR Conference on Computer Vision, Graphics and Image Processing (CVGIP 2003), pp. 123-130, Aug. 17, 2003.

Lienhart, R. "Empirical Analysis of Detection Cascades of Boosted Classifiers for Rapid Object Detection", 25th DAGM Symposium, Magdeburg, Germany, Sep. 10-12, 2003.

Marks, Marilyn, "Student Selected for Intel Award", News at Princeton, Aug. 20, 2002, available at https://www.princeton.edu/main/news/archive/S01/15/27S60/index.xml?section=&path=/main/news/archive/S01/15/27S60/index.xml&next=1.

Mofaddel, M. A. et al., "Adult Image Content Filtering: A Statistical Method Based on Multi-Color Skin Modeling", IEEE International Symposium on Signal Processing and Information Technology, pp. 366-370, Nov. 22, 2010.

United States Department of Defense. (Jan. 11, 2012). Mil-STD 1472G.

Viola, P. et al., "Rapid Object Detection Using a Boosted Cascade of Simple Features", IEEE Conference CVPR. 1, pp. 511-518, 2001.

Zhu, H., Zhou et al., "An Algorithm of Pornographic Image Detection", Proceedings of Fourth International Conference on Image and Graphics, pp. 801-804, 2007.

\* cited by examiner

SYSTEMS AND METHODS FOR DETERMINING IMAGE SAFETY

CROSS-REFERENCE TO RELATED APPLICATION

This application claims the benefit of U.S. Provisional Application No. 61/847,940, filed on Jul. 18, 2013, the entirety of which is hereby incorporated herein by reference.

BACKGROUND

Much research has been devoted to the automatic detection of objectionable imagery. A common focus of such research is detection of pornographic images through the use of certain image analysis techniques, such as support vector machines, shape region techniques or pixel-based detection. Typically, these techniques are particularly tuned to the specific use case of pornographic images. For example, the goal of many systems developed based on such techniques is to identify pornographic images from among images available from a network resource, present on a webpage or submitted to a data store or service. Typically, systems that are designed to identify pornographic images are not well suited to detect other types of images that are not necessarily pornographic, but that may be objectionable to a certain audience or for a certain use or purpose.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
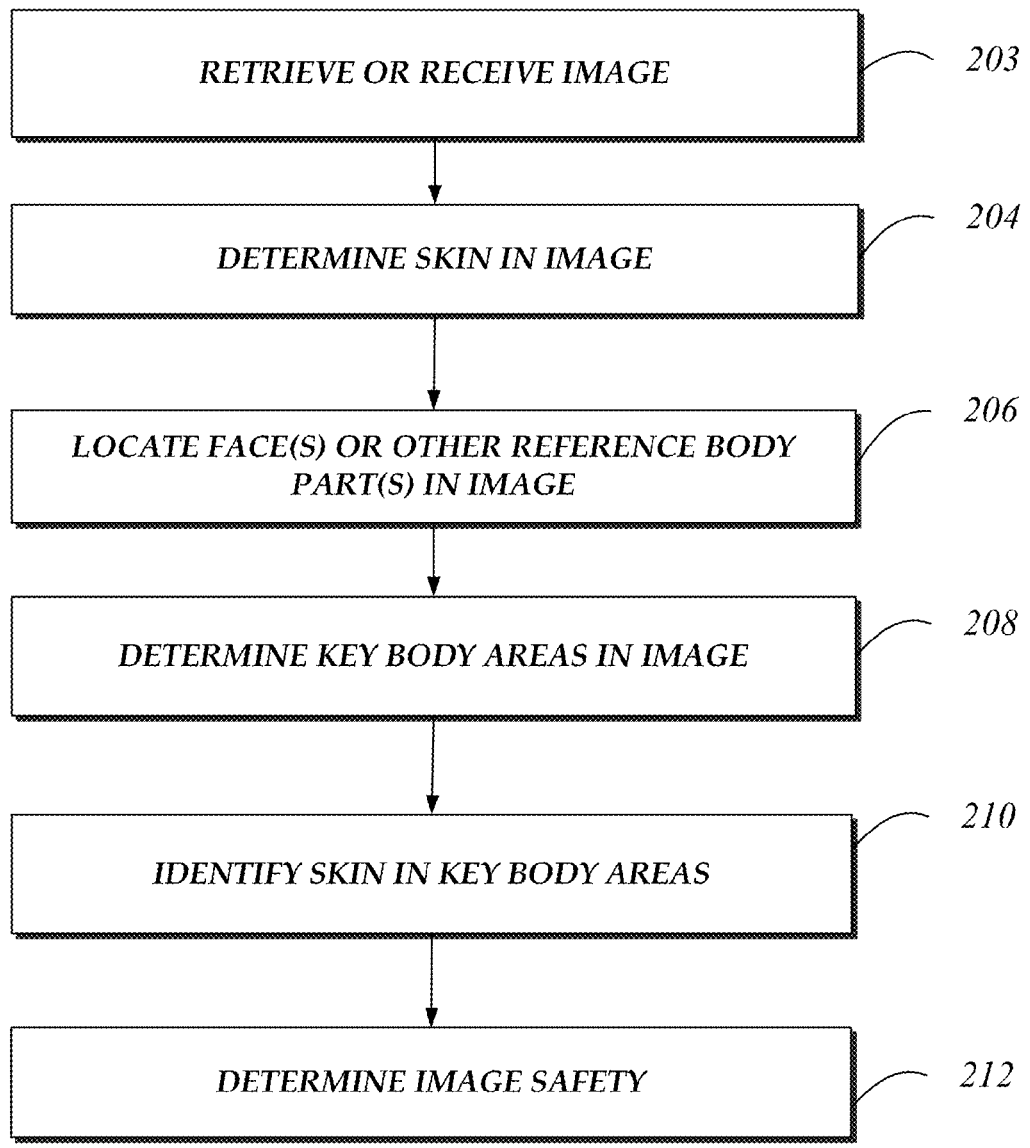
FIG. 1 is one embodiment of a flow diagram of an illustrative method for determining image safety.

Much research has been devoted to the automatic detection of objectionable imagery. In those situations where image safety is directly tied to revenues, the minimization of false alarms rates is of primary importance. Skin detection algorithms that seek to classify images as being safe or unsafe based upon a priori skin content thresholds have been found to have unacceptably high false alarm rates in classifying images as being objectionable. While improved trained classifiers have been introduced which provide good results, they require large training sets and great care must be exercised in the selection of the classification parameters in order to provide the best performance. Aspects of the present disclosure relate to a system that utilizes heuristics based on anthropometry to create a robust system for determining image safety with very low false alarm rates. The meaning of a "safe" image, as used herein, may generally refer to an image that is not likely to be considered objectionable for (or that is considered appropriate for) a given audience, a given use and/or a given context. For example, aspects of the present disclosure relate to systems and methods for analyzing image data to determine whether a given image is appropriate for a given use, such as to be viewed by a child, to be used for a given advertisement, to be displayed in a given location, and/or other uses potentially desired by a publisher, advertiser and/or other individual, entity or system.

Generally described, aspects of the present disclosure relate to systems and methods for heuristically based automated image safety determinations. In some embodiments, image safety determinations may be utilized to pair advertisements with contextually relevant images. For example, if an image is determined to be safe for a given advertising campaign, an advertisement or other marketing message may be placed within the image, overlaid over the image, placed near the image on a page or be otherwise associated with the image. Advertisers may be sensitive not only to the topical content of the images they use, but whether those images are considered by the advertiser to be safe. In addition, aspects of the present disclosure may be implemented in whole or in part to expand avenues for revenue generation that utilize image features, such as adding a moustache to digital images or otherwise altering an image in association with an advertisement, a user request and/or for another purpose. In order to determine appropriate and/or desirable monetization techniques for a given image or library of images, it would be beneficial to discover and retain as much information as possible regarding each image.

Determining image safety has generally concentrated on the detection of pornography through the use of, for example, certain support vector machines shape region techniques and pixel based detection. While these techniques have been shown to be at least somewhat effective for certain purposes, they have generally been developed with a goal of detecting pornographic images. Because pornographic images as a type of target imagery is deemed extremely unsafe, the probability of a Type 1 error is often allowed to rise in order to provide the lowest possible Type 2 error. Accordingly, such techniques are not well-suited for applications in which a high level of accuracy is desired in order to minimize both false positives and false negatives. In addition, many known techniques are particularly tuned to detect pornographic images, an image type which is generally associated with a widely accepted definition of image safety. Such techniques do not lend themselves well to analyzing image types for which a flexible and/or context-specific notion of image safety is to be applied.

In some instances, in order to be suitable for purposes of image safety analysis for in-image advertising or a variety of other potential uses, the definition of an unsafe image in a given embodiment may be broadened to include those images which are unacceptable to one or more client advertisers (such as being in violation of certain criteria or rules associated with an advertiser) and/or those images which might be deemed inappropriate due to specific marketed viewers (such as a viewers of a given age, geography or other demographic element). For example, a specific ad for children's toys might be deemed safe to select for display in association with an image of a woman wearing a bikini bathing suit, but not an image of a woman wearing bra and panties. Similarly, an ad for a travel service to a Muslim country might be deemed unsafe to display in associated with an image of a woman with any skin exposure other than the face. In addition, these thresholds of safety or safety rules might vary from one client to the next, in some cases even within the same product target.

Aspects of the present disclosure may allow for simple and rapid definitions of image safety or video safety that may be tailored by or based at least in part on input from (or information associated with) an administrator, advertiser, publisher or other user, and/or based on an intended use of the image(s) or video(s) subsequent to performing the image safety analysis. Additionally, a computing system as described herein may determine and retain anthropometric and/or feature data for possible further image data exploitation, such as advertising use of the image, modifications to the image, use of the image in a given context or environment, cataloging or labeling the image, and/or other use. While the example of still images is often used herein, the image analysis and other features described herein, in some embodiments, may be equally applied to moving imagery or video data. In some embodiments, various media or content, such as a game, webpage or user interface, may be classified as safe or unsafe based at least in part on analysis of image data or other visual data included therein or associated therewith.

Example Methods

FIG. 1 is one embodiment of a flow diagram of an illustrative method for determining image safety. In some embodiments, the illustrative method may be implemented by an image analysis module 150, as further described below. The illustrative method begins at block 203, where one or more images to be analyzed are received from another computing device or retrieved from an electronic data store. For example, the computing system 100 described below may receive image data from a client device 164 or may retrieve image data from a data source 162 via a network 160, as further described below. As one example, an image file that is referenced in a page or other network resource may be received by the computing system 100 in order for the image analysis module 150 to determine whether the image is a suitable candidate to have an advertisement placed on or in association with the image on the page. It will be appreciated that the image file or other image data received at block 203 may be in any of a variety of forms or file types, may be compressed or uncompressed, and may include metadata of various types.

Determine Skin

At block 204 in the illustrative method, the image analysis module 150 determines or identifies the pixels or other portions of the image that likely correspond to human skin of a subject in the image (such as a photographed human model). For example, according to one embodiment, the entire target image, T, with center $(X_c, Y_c)$ is searched to find all pixels corresponding to skin. This skin detection may be conducted utilizing any of a variety of methods for detecting skin. As an example, in some embodiments, skin detection may be conducted utilizing a facial skin color model based at least in part on the RGB-H-CbCr Skin Colour Model for Human Face Detection developed by Abdul Rahman, Wei and See. This skin model, although targeted at the detection of faces, performs well in detecting body skin. This body area detection, while considered undesirable in the face detection context for which the Rahman model was originally developed, is well suited for aspects of the image safety system disclosed herein.

The Abdul Rahman, Wei and See skin color model consists of three rules (referred to below as Rule A, Rule B and Rule C) which must all return TRUE for a given pixel in order for the pixel to be declared skin. In other embodiments, the model may be modified to include more or fewer rules and/or may not require that every rule be fulfilled in order for a given pixel to be declared skin.

Two rules are defined to model skin in the RGB color space. One for skin under uniform daylight given as $$(R>95) \text{ AND } (G>40) \text{ AND } (B>20) \text{ AND } (\max\{R,G,B\}-\min\{R,G,B\}>15) \text{ AND } (|R-G|>15) \text{ AND } (R>G) \text{ AND } (R>B) \quad (1)$$

and the second for skin under flash or daylight lateral lighting given by $$(R>220) \text{ AND } (G>210) \text{ AND } (B>170) \text{ AND } (|R-G|\leq 15) \text{ AND } (R>B) \text{ AND } (G>B) \quad (2)$$

In one embodiment, a logical OR is then used to combine rule (1) and rule (2). This RGB rule is denoted as Rule A.

Next, 5 bounding rules enclosing the Cb-Cr color region may be formulated as below:

$$Cr \leq 1.5862 \times Cb + 20 \quad (3)$$

$$Cr \geq 0.3448 \times Cb + 76.2069 \quad (4)$$

$$Cr \geq -4.5652 \times Cb + 234.5652 \quad (5)$$

$$Cr \leq -1.15 \times Cb + 301.75 \quad (6)$$

$$Cr \leq -2.2857 \times Cb + 432.85 \quad (7)$$

A logical AND may then be used to combine rules (3) to (7). This CbCr rule is denoted as Rule B.

Finally, two cutoff levels are defined in the HSV color space as below:

$$H < 25 \quad (8)$$

$$H > 230 \quad (9)$$

A logical OR may then be used to combine rules (8) and (9). This HSV rule is denoted as Rule C.

$$\text{Rule } A: \text{Equation}(1) \cup \text{Equation}(2) \quad (10)$$

$$\text{Rule } B: \text{Equation}(3) \cap \text{Equation}(4) \cap \text{Equation}(5) \cap \text{Equation}(6) \cap \text{Equation}(7) \quad (11)$$

$$\text{Rule } C: \text{Equation}(8) \cup \text{Equation}(9) \quad (12)$$

In this embodiment, each pixel that fulfills Rule A, Rule B and Rule C is classified as a skin pixel, $$\text{Rule } A \cap \text{Rule } B \cap \text{Rule } C \quad (13)$$

In some embodiments, the image analysis module may further process the image based on the skin analysis in order to segment skin regions and/or fill holes in regions. According to other embodiments, beyond the classification of each image pixel as "skin" or "not skin" (or an indication of the likelihood or confidence that a given pixel corresponds to skin), no further processing is performed to segment the skin regions or to fill holes in regions (as represented in FIG. 2, according to one embodiment). Skin related data statistics may be generated and stored by the image analysis module 150, such as one or more of the following.

The percentage, P, of skin pixels, in the image as a whole $$P = \text{\#skin pixels/total \#pixels} \quad (14)$$

Given a pixel, $P_{j,k}$, at location $x_k, y_j$ The spatial moment or order (m,n) may be determined as $$M(m,n) = \Sigma_j \Sigma_k x_k^m y_j^n P_{j,k} \quad (15)$$

The center of mass of the skin area $C = (C_x, C_y)$ may be determined as $$C_x = \frac{M(1, 0)}{M(0, 0)} \quad (16)$$

$$C_y = \frac{M(0, 1)}{M(0, 0)} \quad (16)$$

The area of the skin may be defined as the zeroth spatial moment of the skin mass, M(0,0) and the skin pixel density, D, of the skin given by $$D = \frac{P}{M(0, 0)} \quad (17)$$

Figure 3:
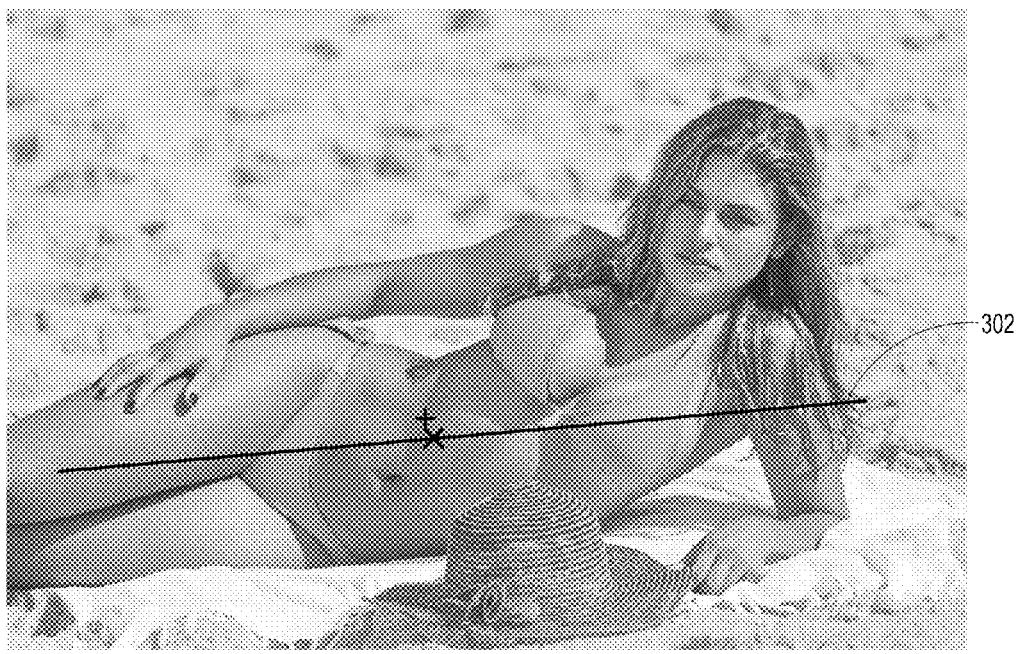
FIG. 3 is an illustrative representation of a best-fit line to the skin area within an image, according to one embodiment.

Finally, the convex hull of the skin pixels may be determined and a standard linear least squares fit to the convex hull in order to create a best-fit line to the skin area (as represented in FIG. 3, according to one embodiment).

According to some embodiments, once one or more of the above data have been generated or determined, an early threshold may be applied to determine if the percentage of skin in the image is too small to allow for a discernible human body and/or if the skin pixel density is so low that no human form is likely to exist in the image. According to one embodiment, the lower bound of skin percentage for declaring that a human form might be possible may be 0.095 and a density value of 0.12 may be used as the lower bound on skin pixel density. In some embodiments, if the target image is found to be below either of these values, the image is determined by the image analysis module to be safe due to it most likely being non-human, and no further processing is performed in some such embodiments.

In some embodiments, the image analysis module may utilize one or more texture analysis techniques when determining skin areas. For example, the texture value of an area of an image may be determined and then used to segment the image into areas of similar texture. A determination of a texture value corresponding to skin in an image may be made and this texture value may be used to segment an image into areas of skin and not skin. Similarly, a determination of texture value may be used to classify an image area as hair, a specific clothing fabric and/or other texture.

Locate Faces or Other Reference Body Part(s)

At block 206 in the illustrative method, the image may be analyzed to detect and identify the location within the image of one or more faces or other reference body parts. While the illustrative method will be described below with reference to embodiments in which a face is used as the anchor or reference body part located at block 206, one or more other body parts may alternatively or additionally be located and used as the anchor or reference body part in other embodiments. A reference body part may generally be considered a body part which may serve as an initial landmark for the location of other body parts. Reference body parts which may serve as an initial landmark include, but are not limited to, a face, one or more eyes, one or more ears, nose, mouth, head, one or more hands, one or more feet, navel, one or more breasts, one or more fingers, one or more toes, one or more shoulders, one or more wrists, one or more buttocks, one or more knees, one or more nipples, genitals, crotch area, waist, one or more hips, neck, midline of the back, and/or one or more elbows.

According to some embodiments, if the percentage of skin and the skin density indicate a possible human form, one or more facial classifiers may be implemented by the image analysis module. For example, according to one embodiment, a facial classifier such as that defined by Viola and Jones (described in *Rapid Object Detection Using a Boosted Cascade of Simple Features*) may be utilized to detect all faces within the image. In some embodiments, a frontal face classifier (such as, for example, a face detector similar to that described by Rainer Lienhart et al., which utilizes the Gentle AdaBoost algorithm) and/or a profile face classifier (such as, for example, the "20×20 profile face detector" developed by David Bradley) may be utilized to detect face candidates. According to one embodiment, face detections that exceed a given skin pixel threshold, such as 0.13 or other value, are determined to be a candidate face. In some embodiments, as each face candidate is discovered, duplicate faces may be removed. Removal may be accomplished by a simple region-overlapping test, as one example. Given a set of n rectangular regions $R=\{R_1, R_2, \ldots R_n\}$, with rectangular region $R_j$ having a center given by $(m_{j,x}, m_{j,y})$, width given by $w_{rj}$ and height given by $w_{hj}$, and a candidate region $R_c$, the system may declare $R_c$ to be a duplicate if $$(M_{c,x}, M_{c,y}) \cap M_{j,x}, M_{j,y}) \neq \emptyset \forall R_n \in R \quad (18)$$

In some embodiments, frontal faces may be detected first followed by profile faces as the probability of detection of faces in three-quarters profile by the frontal detector exceeds the probability of detection by the profile detector. The order of detection may be specific to the choice of detectors implemented in a given embodiment and may differ among embodiments that utilize different detectors. Accordingly, it will be appreciated that the specific ordering of detection and/or the number of facial detector(s) employed by the image analysis module 150 varies depending on the embodiment.

Figure 4:
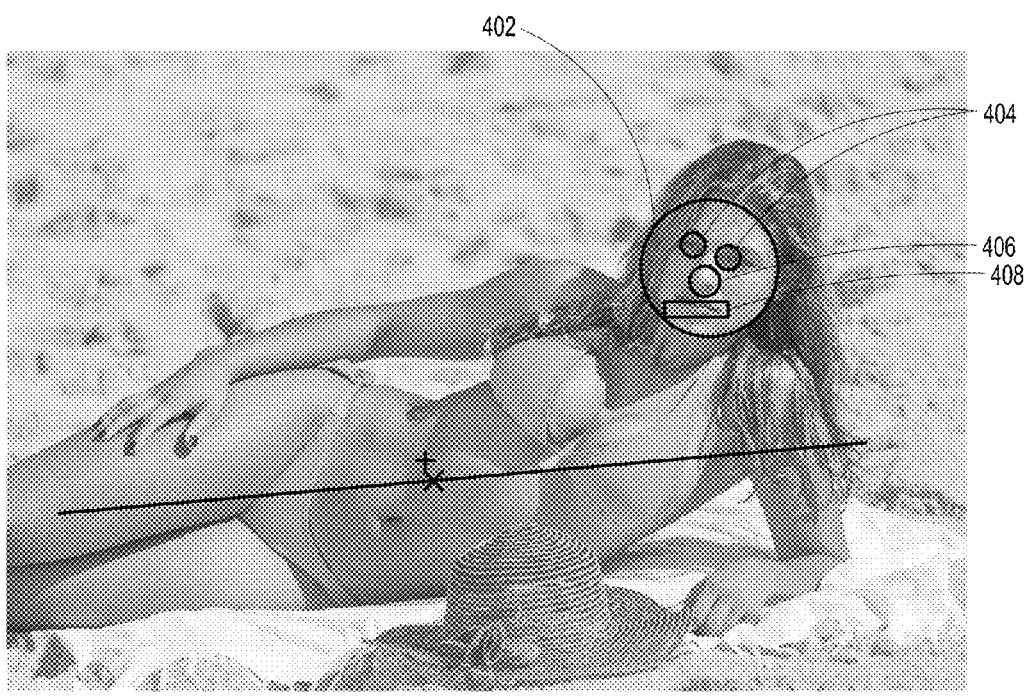
FIG. 4 is an illustrative representation of determined locations of facial features within a facial region in an image, according to one embodiment.

Once the set of one or more detected faces $F=\{R_1, R_2, \ldots, R_m\}$, has been formed from the set of candidate facial regions R, a set of one or more facial feature detectors may be implemented by the analysis module 150 to determine the location of one or more eyes, noses, mouths and/or other facial features within each facial region, $R_m$ (as represented in FIG. 4, according to one embodiment). A variety of different facial feature detectors that are known in the art may be employed, in some embodiments. For example, a different facial feature detection method may be utilized for identifying each of a mouth, eyes, a nose and/or other facial features.

In some embodiments, each feature detector may analyze only the image data contained within the facial region of interest, $R_m$. As each feature set $$G=\{E_1, E_2, \ldots, E_j, N_1, N_2, \ldots, N_k, M_1, M_2, \ldots, M_m\},$$

with eye region detections $E_j$, $N_k$, $M_m$; (j,k,m∈I), a set of heuristics based on anthropometric data may be utilized to assemble complete faces, and rejecting false alarms for each feature. In particular, because of the various expressions which can be made with the human mouth, it is often confused for an eye by mouth detectors and vice-versa. It is known, for example, that a pair of eyes cannot be located below a nose or mouth except if a person is upside down, in which case a frontal face detector will not have made a detection. The analysis module 150 may base its facial feature detection at least in part on anthropometric data from the United States Department of Defense and/or other sources, and/or based on fundamental anatomy. For example, an upright or tilted and/or rotated head position may rule out the location of the mouth at the top of the face, even in the presence of no other feature detections.

Determine Key Body Areas

Figure 5:
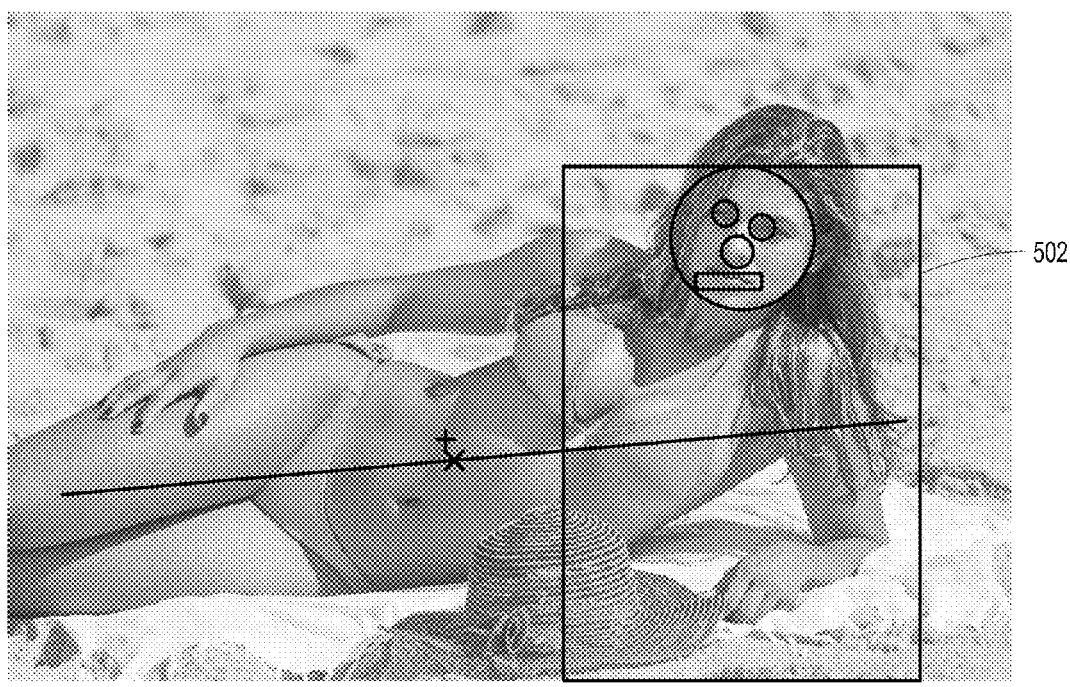
FIG. 5 is an illustrative representation of a search area for body locations within an image, according to one embodiment.

At block 208 in the illustrative method, the image analysis module determines key body areas in the image. Depending on the embodiment, key body areas may include one or more of hair, chest area, face area, midriff area, crotch area, one or more buttocks, buttock area, one or more arms, one or more legs, one or more hands, one or more feet, torso, one or more shoulders, one or more eyes, one or more ears, nose, mouth, neck, waist, one or more hips, one or more thighs, and/or other distinct regions, anatomical features or set of features. In some embodiments, the set of detected faces F is utilized to generate a set of probable search rectangles S, centered at $m^*=(m_{1,x}, m_{1,y})$ with width $w_s$, height $h_s$ and rotation angle $\theta_s$ for body location. Sample search rectangles are represented in FIG. 5, according to one embodiment.

Key body areas may be determined, in some embodiments, based at least in part on anthropometric measurement of the image. Anthropometric measurements may be generated based at least in part on published anthropometric studies, novel physical measurements, probabilistic determination applied to a plurality of existing imagery, photogrammetric determination applied to a plurality of existing imagery and/or other methods. In some embodiments, anthropometric data may be used to generate a set of heuristics for these search rectangles, such as in the following manner:

$\forall R \in F$, calculate $Sj$, centered at $s^*=(m_{j,x},m_{j,y})$, $w_s=w_{r1}\times 1.5, h_s=h_{r1}\times 2.0, a_s=90$.

In some embodiments, the system may determine the skin pixels utilizing equation (13) and determine the image moments of these pixels utilizing equation (15), then calculate the least squares linear fit to the convex hull and its angle $\beta$.

If $F=\{R_1\}$ and $(m_{1,x}, m_{1,y}) \approx (X_c, Y_c)$, then
$\theta_s=90, w_s=w_{r1}\times 1.5, h_s=h_{r1}\times 3.0$ (H1)

If $F=\{R_1\}$ and $(m_{1,x}, m_{1,y}) \neq (X_c, Y_c)$ and
$R_1)C \neq \emptyset, w_s=w_{r1}\times 1.5, h_s=h_{r1}\times 3.0$ and calculate
$\theta_s$ as angle from $(m_1,m_{1,y})$ to $(C_x,C_y)$ (H2)

If $F=\{R_1\}$ and $(m_{1,x},m_{1,y}) \neq (X_c,Y_c)$ and
$R_1)C=\emptyset, w_s=w_{r1}\times 1.5, h_s=h_{r1}\times 3.0, \theta_s=\beta$. (H3)

If $F \neq \{R_1\}$, then $\forall R \in F$, calculate $Sj$, centered
at $(m_{j,x}, m_{j,y}), w_s=w_{r1}\times 1.5, h_s=h_{r1}\times 2.0, \theta_s=\beta$. (H4)

Once the angle $\theta$ has been determined, one or more body area rectangles $B_i$ may be generated by the analysis module 150, which may correspond to the key body areas to be identified in a given embodiment. For example, in the embodiment represented in FIG. 6, three key body area rectangles are determined, specifically, $B_1$=chest area, $B_2$=midriff area and $B_3$=crotch area. According to one embodiment, $B_i$ may be centered at $b^*=(b_{xi}, b_{yi})$, with height $h_b$, width $w_b$ and rotation angle $\rho_b$. $(b_{xi}, b_{yi})$ may be calculated as $b_1^*=((m^*-C)/\sqrt{m^2+C^2})\times(k\times(\sqrt{s^2+C^2}))$ where $k=95^{th}$ percentile distance from face to chest (19)

$h_1^*=h_{rj}\times \gamma$ where $\gamma=95^{th}$ percentile face height×a scale factor (20)

$w_1^*=w_{rj}\times \delta$ where $\delta=95^{th}$ percentile face width×a scale factor (21)

$\rho_1=a\tan(m^*/C)$ (22)

$b_2^*=((m^*-C)/\sqrt{m^2+C^2})\times(k\times(\sqrt{s^2\times C^2}))$ where $k=95^{th}$ percentile distance from face to midriff (23)

$h_2^*=h_{rj}\times \gamma$ where $\gamma=95^{th}$ percentile face height×a scale factor (24)

$\rho_2=\theta_s$ (25)

$w_2^*=w_{rj}\times \delta$ where $\delta=95^{th}$ percentile face width×a scale factor (26)

$b_3^*=((m^*-C)/\sqrt{m^2+C^2})\times(k\times(\sqrt{s^2+C^2}))$ where $k=95^{th}$ percentile distance from face to crotch (27)

$h_3^*=h_{rj}\times \gamma$ where $\gamma=95^{th}$ percentile face height×a scale (28)

$w_3^*=w_{rj}\times \delta$ where $\delta=95^{th}$ percentile face width×a scale factor (29)

$\rho_3=\theta_s$ (30)

Key body areas may be determined based at least in part on one or more of shape, relative mathematical area, anthropometric measurements, and/or probabilistic detection utilizing one or more machine vision learning algorithms. The key body area determination may include determining key body area location in an image, key body area measurements in an image, key body area skin percentage, key body area orientation in an image, key body area skin density, key body area color, and/or key body area affine hull.

In some embodiments, individual key body area scores and/or other key body area determinations may be stored by the image analysis module 150 in a storage device, such as mass storage device 120 (discussed below), may be made available for processing by a computer program, and/or may be presented to a human for a decision, such as via one or more user interfaces. Individual key body area scores and/or other determinations may be made available to a computer program to present the individual key body area scores to a human for a decision. The decision of the human may be to determine if one or more of a plurality of images may be used for a purpose, such as for use in association with an advertisement. According to some embodiments, as further discussed below, the image analysis module 150 may determine (based at least in part on the individual key body area scores) a clothing style, clothing color, clothing fabric, and/or an amount of body area covered by clothing in the image.

In some embodiments, the image analysis module 150 may alter the image based at least in part on the determined key body area data. Alterations of the image may include, for example, censoring the image by blurring out or overlaying content on portions of key body areas that include a high percentage of skin exposure. Alterations of the image may additionally or alternatively include overlaying or otherwise incorporating image content within the image in order to give the appearance that a human subject in the image is wearing certain clothing or accessories, has body hair, facial hair, skin coloring or tattoos not present in the original received image, and/or other image changes.

Determine Safety

At block 210 in the illustrative method, an amount of skin may be determined within the key body areas. For example, at each key body search area, the percentage of skin pixels ($\lambda_i$, i=1, 2, 3) may be calculated. For example, equation (13), as discussed above, may be applied to each pixel within each key body area in order to determine the percentage of pixels within the key body area that correspond to exposed skin. In other embodiments, as discussed above, skin determinations may be made based at least in part on texture analysis. A key body area score may be determined for each key body area based at least in part on the skin area percentage in the key body area. In some embodiments, the key body area score may be based at least in part on a comparison of the determined skin percentage to one or more predetermined thresholds or bands, which may have been previously determined based on acceptable standards and/or averages of skin exposure present in specific body areas across a number of different images.

At block 212, an overall image safety score, safety level or other safety result may be determined. The image safety score may be determined, in some embodiments, by combining the key body area scores (which may have been determined at block 210) to produce an overall safety score for the image. The key body area scores for one or more specific key body areas may be weighted higher than others in generating the overall safety score. For example, according to one embodiment, the key body area score corresponding to the chest area and buttock area may be given a greater weight than the midriff area. In some embodiments, safety may be determined by a changeable set of heuristics that determine the state of clothing as shown in Table 1. The clothing state $\Delta$, in some embodiments, may be the logical AND of the key body areas:

$$\Delta = \lambda_1 \cap \lambda_2 \cap \lambda_3 \qquad (31)$$

TABLE 1

Safety Rules, according to one embodiment

| Clothing State | % of skin in key body area | | |
|---|---|---|---|
| | Chest Area Skin | Midriff Area Skin | Crotch Area Skin |
| Clothed | <0.10 | <0.01 | <0.01 |
| Naked | >0.70 | >0.70 | >0.70 |
| Naked or very skimpy | >0.85 | >0.4 | <0.4 |
| Topless | >0.85 | <0.4 | <0.4 |
| Lowcut | $0.15 < \lambda_1 \leq 0.85$ | <0.10 | Any |
| Bikini or bra/panties | >0.10 | >0.0 | <0.60 |
| Bikini top or bra | >0.10 | 0.0 (e.g. midriff not in image) | <0.60 |
| No pants or panties or "microbikini" | >0.10 | >0.0 | >0.67 |

A single safety score (or unsafe score, depending on the embodiment) may be stored in a storage device, made available for processing by a computer program and/or made available to a human for a decision. The decision of the human may be to determine if one or more of a plurality of images may be used for a purpose. In some embodiments, the image analysis module may store or present all or a subset of the feature and image parameters determined above to allow for downstream image data exploitation.

In some embodiments, determining the overall image safety may include determining a Boolean value representing that the image is either safe or unsafe for a given purpose or according to a given heuristic or rule set. In some embodiments, this value may be based at least in part on a determination of the type of clothing being worn in the image (for example, a determination that a bikini is being worn by a human model in the image). In some embodiments, an overall safety score may be compared to an acceptable risk threshold or safety threshold that is specific to a given advertising campaign or other intended potential use of the image. For example, a much stricter safety threshold may be employed when the determination is whether an image is safe for use on a children's website (or for advertising a children's product) than when the determination is whether an image is safe for use on a sports website (or for advertising sporting goods). The given thresholds, heuristics or rules employed by the image analysis module 150 in a given instance, according to some embodiments, may depend at least in part on a given advertiser interested in placing an advertisement on or near the image, a publisher that hosts the image on a page, a rights holder associated with the image, a specific viewing user, a country or region associated with the given potential user, and/or other factors.

Sample Image Data Determinations

Figure 2A:
FIG. 2A is an illustrative input image which may be received or retrieved in order to be analyzed for image safety.

FIG. 2A is an illustrative input image 200 which may be received or retrieved by the computing system 100 (such as at block 203 of FIG. 1, discussed above) in order to be analyzed by the image analysis module 150 for image safety. While the image 200 illustrated in FIG. 2A is a photograph of a woman in a bikini, it will be appreciated that, according to some embodiments, any image may be analyzed by the image analysis module 150 for image safety, including images other than photographs (such as, without limitation, drawings, paintings or computer-generated images) and/or images that do not contain any human figures represented therein. FIGS. 2-6 are illustrative image representations that include graphical representations of various determinations made by the image analysis module 150, such as may be determined at different blocks of the illustrative method described above with reference to FIG. 1.

Figure 2B:
FIG. 2B is an illustrative representation of skin detected within an image, according to one embodiment.

FIG. 2B is an illustrative representation 202 of skin detected within the image 200, according to one embodiment. In the illustrated embodiment, the representation 202 includes only those pixels of image 200 which have been determined by the image analysis module 150 to correspond to human skin, as discussed above with respect to block 204 of FIG. 1. The remaining, non-skin pixels of image 200 have been masked and presented in representation 202 as black pixels, for illustrative purposes. It will be appreciated that in some embodiments, the image analysis module 150 may enable a user or system administrator to adjust a threshold or sensitivity to the skin detection, such that more or less pixels may be identified as skin. In some embodiments, the image analysis module 150 may fill in holes and/or remove stray pixels that were incorrectly identified as skin based at least in part on an analysis of the surrounding pixels, the detection of body areas, and/or other factors.

FIG. 3 is an illustrative representation of a best-fit line 302 to the skin area within an image, according to one embodiment. The best fit line 302 is illustrated relative to received image 200, discussed above. As discussed above, the best-fit line 302 to the skin area may be determined by the image analysis module 150, in some embodiments, by first determining the convex hull of the skin pixels. The image analysis module 150 may then have generated the best-fit line 302 by determining the standard linear least squares fit (or other fit) to the convex hull. It will be appreciated that, in other embodiments, a similar best-fit line may be generated in a variety of other ways based at least in part on the skin determinations made by the image analysis module 150.

FIG. 4 is an illustrative representation of determined locations of facial features within a facial region 402 in an image, according to one embodiment. As illustrated, the marked facial features identified by the image analysis module 150 include eye regions 404, a nose region 406 and a mouth region 408. The various facial features and/or regions may have been determined according to methods discussed above with respect to FIG. 1. For example, one or more facial feature detectors may have been implemented or executed by the computing system 100 in order to locate facial features within each candidate facial region identified in the image. The determinations may have been made, in some embodiments, based at least in part on a rule set determined from an analysis of various anthropometric data.

FIG. 5 is an illustrative representation of a search area 502 for body locations within the image 200, according to one embodiment. As illustrated, the sample search area 502 may have been determined by the image analysis module 150, such as by implementing aspects of the disclosure discussed above with respect to block 208 of FIG. 1. For example, the search area 502 may represent a probable search area for key body areas or key body parts based at least in part on the location of faces previously identified in the image.

Figure 6:
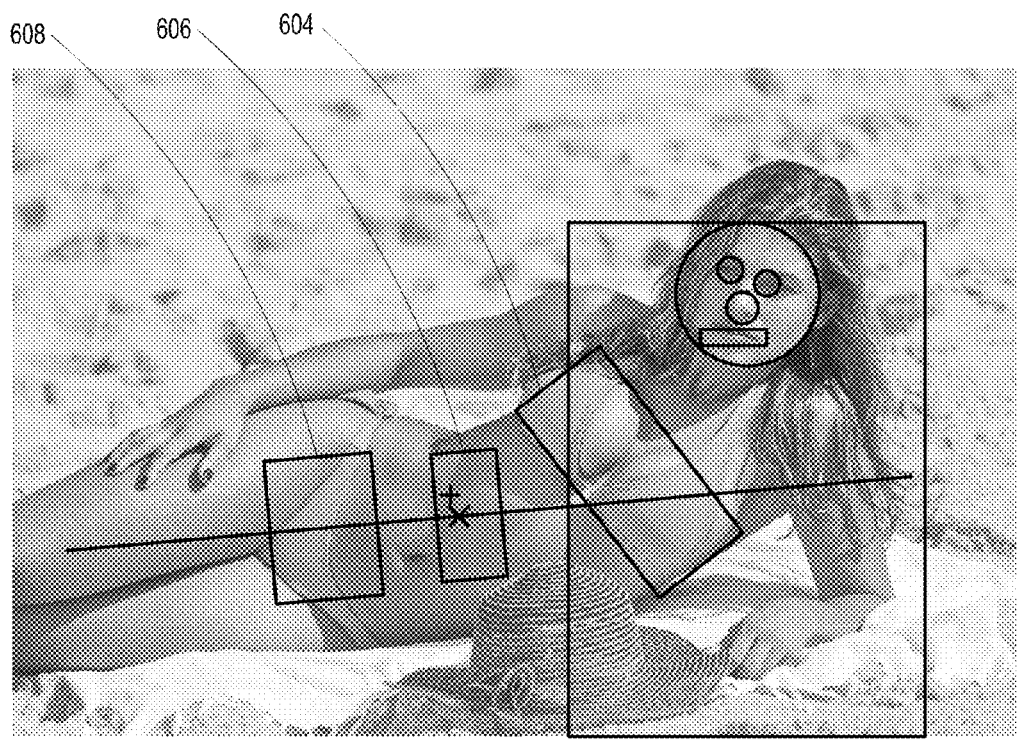
FIG. 6 is an illustrative representation of determined key body search areas within an image, according to one embodiment.

FIG. 6 is an illustrative representation of determined key body areas 604, 606 and 608 within the image 200, according to one embodiment. The illustrated key body areas include a chest area 604, a midriff area 606 and a crotch area 608. It will be appreciated that, in other embodiments, the analysis module 150 may additionally or alternatively identify other body areas considered to be key body areas according to a given embodiment, as discussed in more detail above. The key body areas may have been determined by the image analysis module 150 based at least in part on the determined location of one or more faces, the determined body search area(s) and/or the determination of skin. For example, according to one embodiment, the key body areas 604, 606 and 608 may have been generated based at least in part on one or more approaches discussed above with respect to blocks 208 and 210 of FIG. 1.

Sample Results and Uses

A set of 11,621 random images from the Internet were inspected manually and classified as safe if clothing state="clothed" or no human form, unknown if clothing state="lowcut" or "bikini or bra/panties" or "bikini top or bra" and unsafe if clothing state="Naked" or "Topless" or "naked or very skimpy" or "no pants or panties or microbikini". 9483 were deemed safe, 202 were deemed unsafe and 1694 were deemed unknown. A computing system similar to that described herein correctly classified 9453 safe images as safe and classified 30 safe images as unsafe. The computing system correctly classified 1581 images as unknown and classified 113 unknown images as unsafe. The computing system correctly classified 192 unsafe images as unsafe, and classified 10 unsafe images as safe. The probability of false classification as an unsafe image was only 1.3%. Accordingly, aspects of the present disclosure have been shown to provide an effective and flexible framework for determining image safety. Aspects of the present disclosure allow for a variable definition of safety and provide a significant amount of image-derived data to allow for future exploitation.

In some embodiments, the system may be expanded to include texture analysis to provide for a more accurate clothing estimate. In addition, an application programming interface ("API") and/or interface may be provided for defining safety based at least in part on key body areas and/or other factors.

Potential downstream use of images, videos or other analyzed content based on the safety determinations made by the image analysis module 150 may vary depending on the specific embodiment. It will be appreciated that the flexible approach to image safety described herein may enable aspects of the disclosure to be implemented in a wide variety of contexts and with respect to a wide range of types of images or other content. Example determinations or downstream use of one or more aspects of the disclosure (such as image safety scores, clothing states, and/or others) include, but are not limited to: determining whether to place an advertisement on an image or near an image; determining whether an advertisement that includes a photo or drawing of a human figure is appropriate to display on a given page or in a given location; determining whether a user-submitted photo or other image is appropriate for adding to a social network, image library, or other repository or system; ranking or scoring the safety of a webpage, website, application, movie, image library or other data source based on collective analysis of a variety of images included in or associated with the data source; filtering pages, image search results or other content to remove or censor potentially unsafe images prior to a server sending the images, page or other content to a user; and/or filtering or blocking unsafe images on a client device, such as via a plugin or specialized browser executed by a client device, such as client system 164 discussed below, which may be installed by a parent to limit content access by children or installed by an employer to limit employee access to network content.

Computing System

Figure 7:
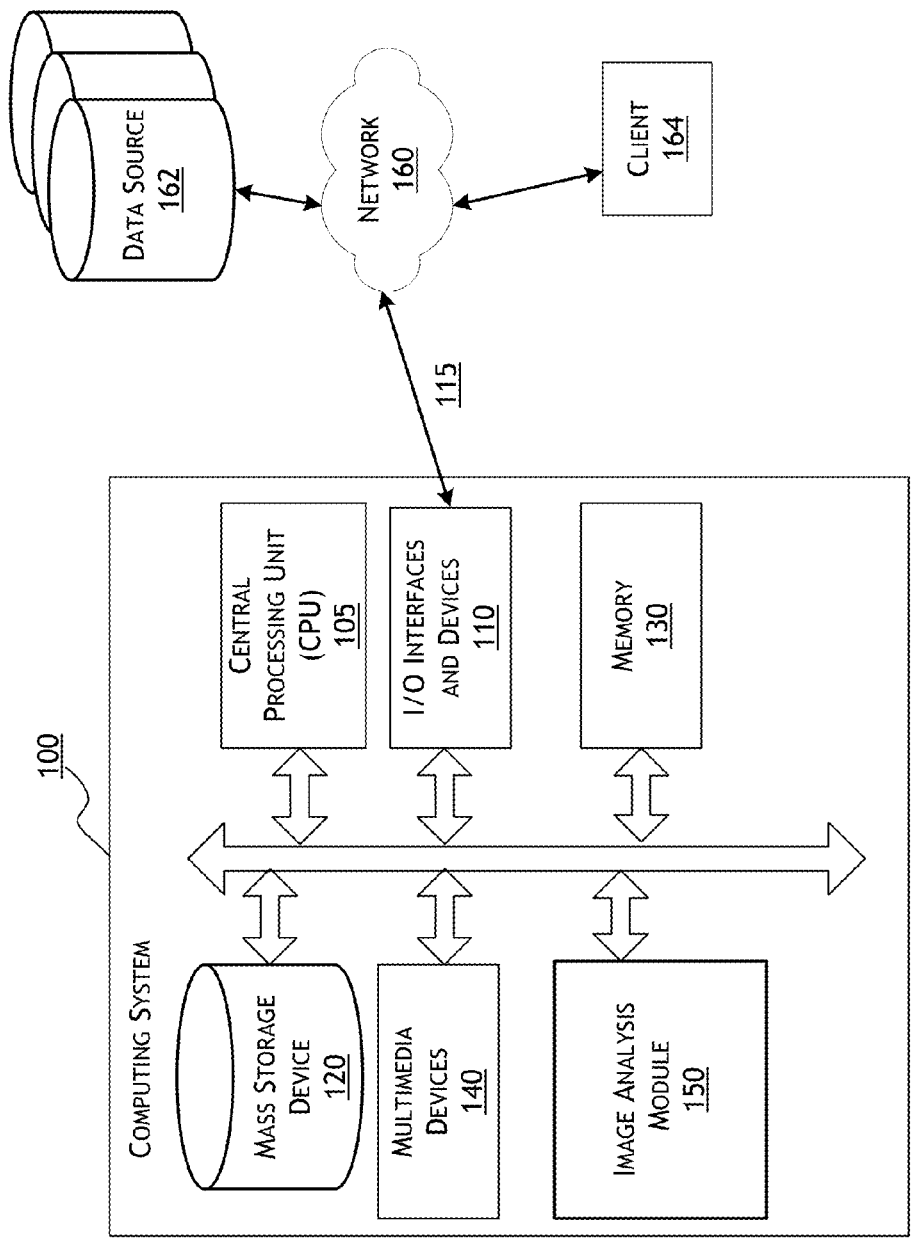
FIG. 7 is a block diagram of a computing system that implements aspects of the present disclosure, according to one embodiment.

In some embodiments, the systems, computer clients and/or servers described above take the form of a computing system as shown in FIG. 7. FIG. 7 is a block diagram showing an embodiment in which computing system 100 is in communication with a network 160 and various systems are also in communication with the network 160. The computing system 100 may be used to implement systems and methods described herein. For example, the computing system 100 may be configured to analyze images to determine safety of the images, determine if an image is appropriate for a given purpose and/or any other functionality described above. In some embodiments, the system is accessed remotely by the client 164, the system is local to the client 164, and/or a combination of the two.

The computing system 100 includes, for example, a personal computer that is IBM, Macintosh, or Linux/Unix compatible. In one embodiment, the computing system 100 comprises a server, a desktop computer, a laptop computer, a tablet computer, a mobile phone, a personal digital assistant, a kiosk, or an audio player, for example. In one embodiment, the exemplary computing system 100 includes a central processing unit ("CPU") 105, which may include a conventional microprocessor. The computing system 100 further includes a memory 130, such as random access memory ("RAM") for temporary storage of information and a read only memory ("ROM") for permanent storage of information, and a mass storage device 120, such as a hard drive, diskette, or optical media storage device. Typically, the modules of the computing system 100 are connected to the computer using a standard based bus system. In different embodiments, the standard based bus system could be Peripheral Component Interconnect ("PCI"), Microchannel, Small Computer System Interface ("SCSI"), Industrial Standard Architecture ("ISA") and Extended ISA ("EISA") architectures, for example. In addition, the functionality provided for in the components and modules of computing system 100 may be combined into fewer components and modules or further separated into additional components and modules.

The computing system 100 is generally controlled and coordinated by operating system software, such as Windows 95, Windows 98, Windows NT, Windows 2000, Windows XP, Windows Vista, Windows 7, Windows 8, Unix, Linux, SunOS, Solaris, Maemeo, MeeGo, BlackBerry Tablet OS, Android, webOS, Sugar, Symbian OS, MAC OS X, iOS or other operating system(s). In Macintosh systems, the operating system may be any available operating system, such as MAC OS X. In other embodiments, the computing system 100 may be controlled by a proprietary operating system. Conventional operating systems control and schedule computer processes for execution, perform memory management, provide file system, networking, I/O services, and provide a user interface, such as a graphical user interface ("GUI"), among other things.

The computing system 100 includes one or more commonly available input/output (I/O) devices and interfaces 110, such as a keyboard, mouse, touchpad, and printer. In one embodiment, the I/O devices and interfaces 110 include one or more display device, such as a monitor, that allows the visual presentation of data to a user. More particularly, a display device provides for the presentation of GUIs, application software data, and multimedia presentations, for example. The computing system 100 may also include one or more multimedia devices 140, such as speakers, video cards, graphics accelerators, and microphones, for example.

In the embodiment of FIG. 7, the I/O devices and interfaces 110 provide a communication interface to various external devices. In the embodiment of FIG. 7, the computing system 100 is electronically coupled to a network 160, which comprises one or more of a LAN, WAN, the Internet, or cloud computing, for example, via a wired, wireless, or combination of wired and wireless, communication link 115. The network 160 communicates with various computing devices and/or other electronic devices via wired or wireless communication links.

According to FIG. 7, information may be provided to computing system 100 over the network 160 from one or more data sources including, for example, data source(s) 162. In addition, the data sources may include one or more internal and/or external data sources. In some embodiments, one or more of the databases or data sources may be implemented using a relational database, such as Sybase, Oracle, CodeBase and Microsoft® SQL Server as well as other types of databases such as, for example, a flat file database, an entity-relationship database, and object-oriented database, and/or a record-based database. In addition to supplying data, a client 164 may request information from the computing system 100.

In the embodiment of FIG. 7, the computing system 100 also includes an image analysis module 150, which may be executed by the CPU 105. This module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In the embodiment shown in FIG. 7, the computing system 100 is configured to execute the image analysis module 150, among others, in order to implement various aspects of the present disclosure, as described above. In some embodiments, the image analysis module 150 may be configured to obtain data from data source(s) 162, which may include image files, various rule sets, advertisement data, image classification data and/or other information.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. It will be appreciated that, in some embodiments, one or more modules described herein may be stored as computer-executable instructions in various forms of non-transitory computer readable media. The modules described herein are preferably implemented as software modules, but may be represented in hardware or firmware. Generally, the modules described herein refer to logical modules that may be combined with other modules or divided into sub-modules despite their physical organization or storage.

Various Embodiments

All of the methods described herein may be embodied in, and partially or fully automated via, software code modules executed by one or more general purpose computers. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

In addition, embodiments may be implemented as computer-executable instructions stored in one or more tangible computer storage media. As will be appreciated by a person of ordinary skill in the art, such computer-executable instructions stored in tangible computer storage media define specific functions to be performed by computer hardware such as computer processors. In general, in such an implementation, the computer-executable instructions are loaded into memory accessible by at least one computer processor. The at least one computer processor then executes the instructions, causing computer hardware to perform the specific functions defined by the computer-executable instructions. As will be appreciated by a person of ordinary skill in the art, computer execution of computer-executable instructions is equivalent to the performance of the same functions by electronic hardware that includes hardware circuits that are hardwired to perform the specific functions. As such, while embodiments illustrated herein are typically implemented as some combination of computer hardware and computer-executable instructions, the embodiments illustrated herein could also be implemented as one or more electronic circuits hardwired to perform the specific functions illustrated herein.

The embodiments illustrated herein are illustrative rather than limiting. The invention is not limited to cover only the embodiments explicitly illustrated herein. Rather, a person of ordinary skill in the art will appreciate, in light of this disclosure, that the various embodiments illustrate various features that can be mixed and matched by a skilled artisan in order to design a system with the particular feature set desired by the skilled artisan. All novel and non-obvious inventions that would be apparent to a person of ordinary skill in the art in light of this disclosure are within the scope of the subject matter that may be claimed in subsequent non-provisional applications. The various features, tools, systems and methods described herein may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without user input or prompting, whether these features, elements or steps are included or are to be performed in any particular embodiment. In addition, the term "or" is sometimes used in its inclusive sense (and not in its exclusive sense) so that when used, the term "or" means one, some, or all of the elements in the list.

What is claimed is:

1. A system for determining safety of an image, the system comprising:
    an electronic data store that stores a plurality of images; and
    a computing device, having one or more physical processors, that is in communication with the data store and that is configured to at least:
        retrieve, from the electronic data store, an image;
        analyze image data of the image to identify a plurality of pixels corresponding to skin of at least one human portrayed in the image;
        determine a location within the image of a face of the at least one human;
        determine a plurality of probable search areas within the image using the determined location of the face as a reference;
        determine a location within the image of at least one body area, wherein the location within the image of the at least one body area is determined based at least in part on an analysis of the probable search areas, wherein the at least one body area comprises at least one of a crotch area, a chest area or a midriff area;
        determine an amount of skin included in the image within the at least one body area; and
        based at least in part on the amount of skin within the at least one body area, determine an image safety level for the image.

2. The system of claim 1, wherein the image safety level comprises an indication of a clothing state of the at least one human portrayed in the image.

3. The system of claim 1, wherein determining the image safety level comprises classifying the image as safe or unsafe for an identified purpose.

4. The system of claim 3, wherein the identified purpose comprises associating the image with an advertisement.

5. The system of claim 4, wherein the computing device is further configured to present the advertisement in association with the image when the image is classified as safe for the identified purpose.

6. A computer-implemented method comprising:
    as implemented by one or more computing devices configured with specific executable instructions,
        determining a location within an image of at least one distinct body part of at least one human portrayed in the image;
        determining a plurality of probable search areas within the image using the determined location of the at least one distinct body part as a reference;
        determining a location within the image of at least one body area, wherein the location within the image of the at least one body area is determined based at least in part on an analysis of the probable search areas;
        determining an amount of skin included in the image within the at least one body area; and
        based at least in part on the amount of skin within the at least one body area, determining an image safety level for the image.

7. The computer-implemented method of claim 6, wherein determining the amount of skin included in the image within the at least one body area comprises determining a percentage of pixels that represent skin in a portion of the image corresponding to the at least one body area.

8. The computer-implemented method of claim 6, wherein determining the amount of skin included in the image within the at least one body area comprises analyzing one or more textures in the image.

9. The computer-implemented method of claim 6, wherein the at least one body area comprises at least one of a crotch area, a chest area or a midriff area.

10. The computer-implemented method of claim 6, wherein the image safety level comprises an indication of a clothing state of the at least one human portrayed in the image.

11. The computer-implemented method of claim 6, wherein the image safety level comprises a numeric score.

12. The computer-implemented method of claim 11, further comprising determining whether the image is safe for an intended purpose based at least in part by comparing the numeric score to a safety threshold.

13. The computer-implemented method of claim 6, wherein determining the image safety level comprises classifying the image as safe or unsafe for display in association with an advertisement.

14. The computer-implemented method of claim 6, wherein determining the image safety level comprises classifying the image as safe or unsafe for display to a given user.

15. The computer-implemented method of claim 6, wherein the at least one distinct body part is a human face.

16. A computer-readable, non-transitory storage medium storing computer executable instructions that, when executed by one or more computer systems, configure the one or more computer systems to perform operations comprising:
    determining a location within an image of at least one body part of at least one human;
    using the determined location of the at least one body part as a reference, determining a plurality of probable search areas within the image;
    determining a location within the image of at least one body area of the at least one human, wherein the location within the image of the at least one body area is determined based at least in part on an analysis of the probable search areas;
    determining an amount of skin included in the image within the at least one body area; and
    based at least in part on the amount of skin within the at least one body area, determining whether the image is safe for use in a context.

17. The computer-readable, non-transitory storage medium of claim 16, wherein determining whether the image is safe for use in the context comprises automatically applying one or more rules associated with the context.

18. The computer-readable, non-transitory storage medium of claim 17, wherein the one or more rules identify at least one threshold amount of skin acceptable within the at least one body area.

19. The computer-implemented method of claim 6, wherein the at least one distinct body part is at least one of: one or more eyes, one or more ears, a nose, a mouth, a navel, one or more breasts, or one or more buttocks.

* * * * *